US009401812B1

(12) United States Patent
Jachner

(10) Patent No.: US 9,401,812 B1
(45) Date of Patent: *Jul. 26, 2016

(54) MESSAGE PRESENCE

(75) Inventor: Jack Jachner, Lexington, MA (US)

(73) Assignee: Alcatel Lucent, Boulogne-Billancourt (FR)

( * ) Notice: Subject to any disclaimer, the term of this patent is extended or adjusted under 35 U.S.C. 154(b) by 1746 days.

This patent is subject to a terminal disclaimer.

(21) Appl. No.: 11/485,140

(22) Filed: Jul. 12, 2006

(51) Int. Cl.
*G06F 15/16* (2006.01)
*H04L 12/18* (2006.01)

(52) U.S. Cl.
CPC ............ *H04L 12/18* (2013.01); *H04L 12/1895* (2013.01)

(58) Field of Classification Search
CPC ............................ H04L 12/18; H04L 12/1895
USPC .................................................. 709/206, 204
See application file for complete search history.

(56) References Cited

U.S. PATENT DOCUMENTS

| | | | | |
|---|---|---|---|---|
| 6,314,454 B1* | 11/2001 | Wang | ................... | G06Q 10/107 358/402 |
| 2003/0097485 A1* | 5/2003 | Horvitz | ................. | G06F 21/335 719/313 |
| 2003/0110228 A1* | 6/2003 | Xu et al. | ........................ | 709/207 |
| 2004/0177119 A1* | 9/2004 | Mason | ................. | G06Q 10/107 709/206 |
| 2005/0071428 A1* | 3/2005 | Khakoo | ............... | G06Q 10/107 709/204 |
| 2005/0216565 A1* | 9/2005 | Ito et al. | ........................ | 709/206 |
| 2005/0228895 A1* | 10/2005 | Karunamurthy et al. | ..... | 709/229 |

OTHER PUBLICATIONS

Day et al. ("a model for presence and instant messaging", M. Day, J. Rosendberg, H. Sugano, Feb. 2000, Network Working Group RFC 2778).*

* cited by examiner

*Primary Examiner* — Dustin Nguyen
*Assistant Examiner* — Joel Mesa
(74) *Attorney, Agent, or Firm* — Loza & Loza, LLP

(57) ABSTRACT

A presence system is used to monitor the presence state of an electronic message originated by a sender and addressed to a recipient. The presence system includes a presence user agent and a presence server. The presence user agent is coupled to a communication network to receive the electronic message, register the electronic message with the presence server as a message presentity, determine presence information for the message presentity and provide the presence information to the presence server. The presence information defines a presence state of the message, in which the presence state identifies a processing state of the electronic message by the recipient. The presence server is also coupled to the communication network to provide the presence information in real-time to watchers of the message presentity.

21 Claims, 3 Drawing Sheets

MESSAGE PRESENCE

BACKGROUND OF THE INVENTION

1. Technical Field of the Invention

The present invention relates in general to a messaging communication system for transmitting messages, and in particular, to a presence-based communication system interfaced with a messaging communication system.

2. Description of Related Art

Messaging communication systems deliver electronic messages from message senders to message recipients. Examples of various types of electronic messages include, but are not limited to, electronic mail (e-mail) messages, facsimile (fax) messages, voicemail messages and instant messages (IM). Each type of electronic message can be managed by a different messaging communication system, or a unified messaging communication system can be provided that manages two or more of the electronic message types (e.g., two or more of e-mail, voicemail, fax and IM).

Typically, messaging communication systems utilize the existing infrastructure of various communication networks, such as the Public Switched Telecommunication Network (PSTN), the Public Land Mobile Network (PLMN), Local Area Networks (LANs) and the Internet, to transmit and receive electronic messages. For example, to deliver an e-mail message, the messaging communication system may transmit the e-mail as Internet Protocol (IP) packets over the Internet. As another example, to deliver a voicemail message, the messaging communication system may transmit the voicemail message as circuit-switched data over the PSTN.

Each message includes an originating address identifying the sender and a destination address identifying the recipient. For example, in a facsimile message, the originating address is the telephone number of the sender and the destination address is the telephone number of the recipient. As another example, in an instant message, the originating address is the IP address of the sender and the destination address is the IP address of the recipient. When routing messages over a communication network, the destination address is used to identify and locate a message server associated with the recipient. The message server may be associated with the particular type of electronic message or the message server may be a unified message server capable of managing several different types of electronic messages.

The message server is coupled to the communication network to receive the message and coupled to one or more recipient terminals (e.g., computer, telephone, fax machine, etc.) to provide the message to the recipient. The message server may also provide additional message processing functionality to the recipient, such as storing the message, filtering the message, converting the message into a format desired by the recipient and providing various messaging options to the recipient for responding to the message. For example, the message server may enable the recipient to generate and transmit a response message to the sender, forward the message to another subscriber or forward the message to another terminal associated with the recipient.

However, existing message communication systems provide only limited information to the sender on the status of the message. Typically, this information is in the form of a simple binary result (e.g., read or un-read; received or not received). For example, an e-mail server may provide a feature commonly known as "return receipt requested" that automatically generates and transmits an e-mail back to the sender when the recipient opens the e-mail message. As another example, a telephony server providing facsimile services to a recipient subscriber may automatically generate and transmit a facsimile message back to the sender during the facsimile call indicating whether the facsimile message was received at the recipient facsimile machine.

This type of binary message status information may not be sufficient in some enterprise and customer service settings, requiring employees to waste valuable time and resources providing additional message status information to the sender. For example, an employee recipient may need to generate and transmit a separate electronic message to the sender informing the sender that the electronic message (voicemail, e-mail, fax or IM) was received and is being processed and/or providing other message processing information to the sender, such as an expected response date, an expected completion date, an appropriate contact person, etc. Therefore, what is needed is a mechanism for providing detailed message status information to the sender.

SUMMARY OF THE INVENTION

Embodiments of the present invention provide a presence system for monitoring the presence state of an electronic message originated by a sender and addressed to a recipient. The presence system includes a presence user agent and a presence server. The presence user agent is coupled to a communication network to receive the electronic message, register the electronic message with the presence server as a message presentity, determine presence information for the message presentity, in which the presence information defines a presence state of the message presentity and the presence state identifies a processing state of the electronic message by the recipient, and provide the presence information to the presence server. The presence server is also coupled to the communication network to provide the presence information in real-time to watchers of the message presentity.

In one embodiment, one of the watchers is the sender of the electronic message, and the electronic message is an electronic mail message, a facsimile message, a voice mail message or an instant message. In addition, the processing state includes one or more of received, acknowledged, un-delivered, un-read, un-listened, read, listened, assigned priority flag, forwarded, replied-to, deleted, saved to file, in-process, presence blocked and a recipient-defined processing state message.

In a further embodiment, the presence system also includes a message server associated with the recipient and coupled to the communication network to receive the electronic message, process the electronic message and to provide the electronic message to the recipient. In this embodiment, the presence user agent can be within the message server.

In still a further embodiment, the presence system also includes a presence user client associated with a select one of the watchers that is operable to receive the presence information from the presence server and to provide the presence information to the select watcher. The presence user client can be running on a terminal having a display and including a graphical user interface operably coupled to display the presence information on the display. In addition, the presence user client can further maintain a list of message presentities for whom the select watcher is a watcher, and enable the select watcher to view the presence information of each of the message presentities on the list.

In another embodiment, the presence server further maintains preference information associated with the message presentity, and is operable to provide the presence information to the watchers based on the preference information. In yet another embodiment, the presence server further maintains preference information associated with a select one of the watchers, and is operable to provide the presence information to the select watcher based on the preference information.

Embodiments of the present invention further provide a method for monitoring the presence state of an electronic message. The method includes the steps of registering an electronic message originated by a sender and addressed to a recipient at a presence server as a message presentity, subscribing watchers to the message presentity in the presence server and maintaining presence information of the message presentity, in which the presence information defines a presence state of the message presentity, and the presence state identifies a processing state of the electronic message by the recipient. The method further includes the step of providing the presence information in real-time from the presence server to the watchers of the message presentity.

BRIEF DESCRIPTION OF THE DRAWINGS

A more complete understanding of the present invention may be obtained by reference to the following detailed description when taken in conjunction with the accompanying drawings wherein.

DETAILED DESCRIPTION OF THE DRAWINGS

Figure 1:
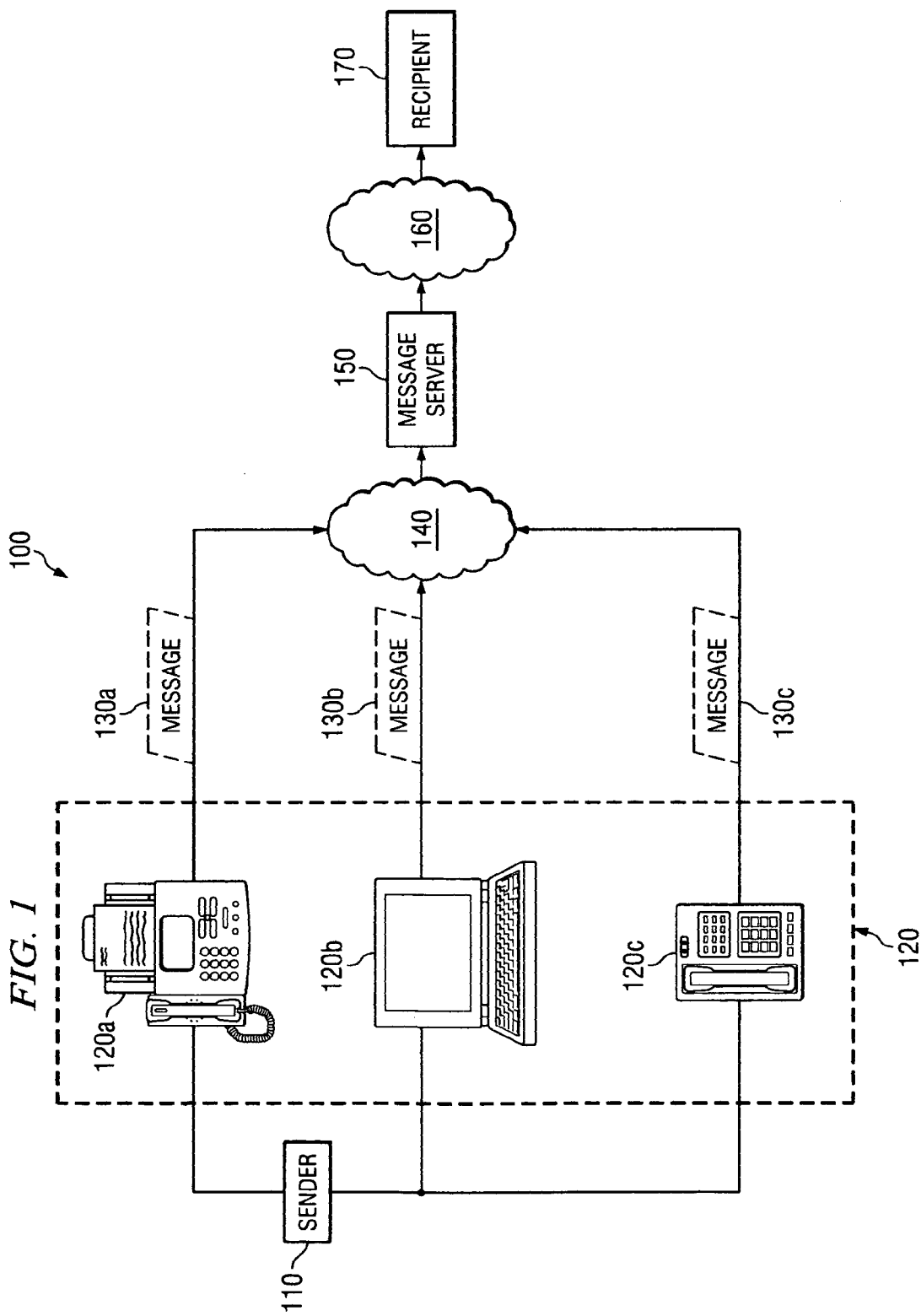
FIG. 1 illustrates an exemplary messaging communication system in accordance with embodiments of the present invention.

FIG. 1 illustrates an exemplary messaging communication system 100 for use with embodiments of the present invention. In general, the messaging communication system 100 includes a message sender 110 for generating an electronic message 130, a message terminal 120 for transmitting the electronic message 130, a message recipient 170 to whom the electronic message 130 is addressed for receiving the message 130 and a message server 150 associated with the message recipient 170 for receiving the electronic message 130, processing the electronic message 130 and providing the electronic message 130 to the message recipient 170.

The message terminal 120 is a user-operated physical communications device capable of sending and/or receiving electronic message communications over a communications network 140. Examples of such terminals 120 include, but are not limited to, a facsimile (fax) machine 120a, a computing device 120b (e.g., a laptop or personal computer) and a telephony device 120c, such as a desktop phone, cell phone, PDA or other user-operated communication device. Each message terminal 120a-120c operates to generate and transmit a respective electronic message 130a-130c. For example, the fax machine 120a is operable to generate and transmit a facsimile message 130a, the computing device 120b is operable to generate and transmit an electronic mail (e-mail) or instant message 130b and the telephony device 120c is operable to generate and transmit a voicemail message 130c. It should be noted that the type of electronic message 130 generated by each type of message terminal 120 is not limited to the specific examples described herein. For example, the fax machine 120a may be operable to generate an e-mail message, voice mail message or instant message, the computing terminal 120b may be operable to generate a fax message or voice mail message and the phone terminal 120c may be operable to generate a fax message, an e-mail message or an instant message.

Each message terminal 120 includes any hardware, software, firmware, or combination thereof for generating and communicating such electronic messages over the communications network 140. For example, in one embodiment, each message terminal 120 includes a messaging application (e.g., software program) that communicates with a user interface to the sender 110 to generate the message 130 and communicates with an external interface to transmit the message 130 over the communications network 140. In addition, each message terminal 120 could include one or more processors that execute instructions (e.g., messaging applications) and one or more memories that store instructions (e.g., messaging applications) and data used by the processors. As used herein, the term processor is generally understood to be a device that drives a general-purpose computer. It is noted, however, that other processor devices such as microcontrollers, Field Programmable Gate Arrays (FPGAs), or Application Specific Integrated Circuits (ASICs), or a combination thereof, can be used as well to achieve the benefits and advantages described herein.

The message server 150 is coupled to receive the electronic message 130 via the communications network 140. In addition, the message server 150 is coupled to provide the electronic message 130 to the recipient 170 via communications network 160. For example, in exemplary embodiments, the message server 150 is a computer network server, a telephony server (e.g., a circuit switch or end office, IP router, gateway, etc.), an e-mail server, a voicemail server, a web server or any other networked device capable of sending and/or receiving electronic message communications over communications networks 140 and 160.

In FIG. 1, the communications networks 140 and 160 each represent any type of network over which media (circuit-switched or packet-switched voice or data) may be sent. For example, the communications networks 140 and 160 may include one or more of the following: the Public Switched Telephone Network (PSTN), Public Land Mobile Network (PLMN), one or more private local area networks (LANs), the Internet and/or any other type or combination of networks.

In an exemplary operation, the sender 110 accesses one of the message terminals (e.g., message terminal 120a) to generate a facsimile (fax) message 130a to the recipient 170. The sender 110 enters the fax number of the recipient 170 into the fax machine 120a and loads one or more pages of a document into the fax machine 120a for scanning and conversion thereof into fax data for transmission as a fax message 130a to the recipient 170. The recipient fax number is used by the communications network 140 to identify and locate the telephony server 150 associated with the recipient 170, and to route the fax message 130a to that telephony server 150. Upon receiving the fax message 130a, the telephony server 150 attempts to establish a call connection with a fax machine at the fax number associated with the recipient 170 via communications network 160. Once a call connection is established, the telephony server 150 transmits the fax data to the fax machine of the recipient 170, which prints the fax data as the one or more pages of the original scanned document. In addition, the telephony server 150 may perform additional processing on the fax message 130a, such as generating an automatic response fax message back to the sender 110 with an indication whether each page of the fax message 130a was received at the recipient fax machine.

In another exemplary operation, the sender 110 accesses message terminal 120b to generate an e-mail message 130b to the recipient 170. The sender 110 enters the e-mail address of the recipient 170 and a textual message stream into the e-mail message 130b. The e-mail address is used by the communications network 140 to identify and locate the e-mail server 150 associated with the recipient 170, and to route the e-mail message 130b to that e-mail server 150.

Upon receiving the e-mail message 130b, the e-mail server 150 may perform additional processing on the e-mail message 130b (e.g., spam filtering, generating an automatic "out-of-office" e-mail message back to the sender 110, automatically forwarding the e-mail message 130b to another e-mail subscriber and converting the message into a format desired by the recipient 170), store the e-mail message 130b for later retrieval by the recipient 170 and/or provide the e-mail message 130b to the recipient 170 (e.g., download the e-mail message 130 via communications network 160 to an e-mail application running on a terminal associated with the recipient 170). In addition, the e-mail server 150, in combination with the e-mail application, may provide various messaging options to the recipient 170 for responding to the message 130b. For example, the e-mail server 150 may enable the recipient 170 to reply to the message 130b, forward the message 130b to another subscriber or another terminal associated with the recipient 170 or save the message 130b in a folder on the e-mail server 150 or a local folder on the terminal associated with the recipient 170.

In another exemplary operation, the sender 110 accesses message terminal 120c to generate a voicemail message 130c to the recipient 170. The sender 110 originally enters the telephone number of the recipient into the phone terminal 120c to establish a call connection with the recipient. The phone number is used by the communications network 140 to identify and locate a telephony server associated with the recipient 170. If the call connection cannot be established between the sender 110 and the recipient 170, the call may be forwarded by the telephony server associated with the recipient 170 to a voice mail server 150 associated with the recipient. The voice mail server 150 may be within the telephony server or may be a stand-alone device.

Upon receiving a prompt from the voice mail server 150, the sender 110 speaks into the phone terminal 120c to provide a voice mail message 130c to the recipient 170. The voice mail message 130c is routed via communications network 140 to the voice mail server 150, which stores the voice mail message 130c for later retrieval by the recipient 170. For example, the recipient 170 can log into the voice mail server 150 at a recipient terminal to retrieve the voice mail message 130c from the voice mail server 150 via communications network 160. In addition, the voice mail server 150 may provide various messaging options to the recipient 170. For example, the voice mail server 150 may enable the recipient 170 to delete the voice mail message 130c, generate a call to the sender 110, forward the voice mail message 130c to another subscriber or another terminal associated with the recipient 170 or save the voice mail message 130c for a certain period of time.

Figure 2:
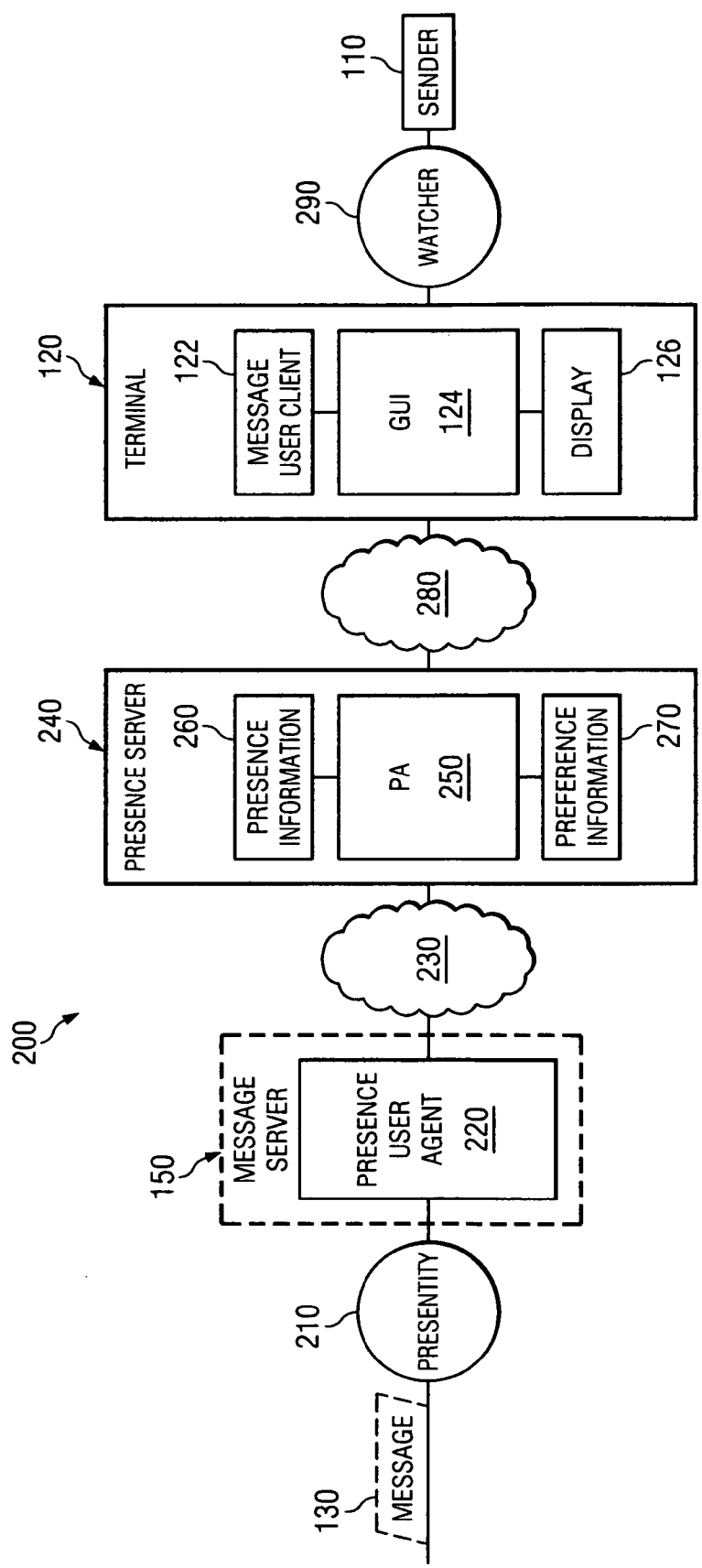
FIG. 2 illustrates an exemplary presence system in accordance with embodiments of the present invention.

Referring to FIG. 2, there is illustrated an exemplary presence system 200 interfaced with various components of the messaging communications system 100 of FIG. 1 for implementing embodiments of the present invention. In general, the presence system 200 includes a presentity 210, a presence user agent (PUA) 220, a presence agent 250, a presence server 240 and one or more watchers 290 of the presentity 210.

In accordance with embodiments of the present invention, the presentity 210 represents an electronic message 130 generated by a message sender 110 and addressed to a message recipient. By way of example, but not limitation, the electronic message 130 may be a facsimile message, e-mail message, instant message or voicemail message. The message presentity 210 provides presence information 260 indicating the presentity's presence state to the presence system 200 via the presence user agent (PUAs) 220 associated with the presentity 210. The PUA 220 represents an application that independently generates a component of the overall presence information for a presentity 210. In an exemplary embodiment, the PUA 220 is included within the message server 150 associated with the recipient of the message 130. In other embodiments, the PUA 220 may be located within another network device and/or within a recipient user device. In FIG. 2, only one PUA 220 is shown for convenience. However, it should be understood that in other embodiments, the number of PUAs 220 can vary based on the system configuration.

The PUA 220 generates and provides the presence information 260 for the presentity 210 to the presence agent (PA) 250 for the presentity 210 within the presence system 200 via communications network 230. The presence information 260 defines a presence state of the message presentity, in which the presence state identifies a processing state of the message by the message recipient. For example, the PUA 220 can generate PUBLISH or NOTIFY messages to the PA 250 to indicate the current message processing state. The PUA 220 messages can typically include a REGISTER, with authentication parameters embedded therein, to log into the PA 250 as the message presentity 210.

Typically, the PUA 220 generates a PUBLISH or NOTIFY message containing presence information 260 when a change in presence state occurs. In the context of message presentities 210, examples of changes in presence state include, but are not limited to, receipt of the message 130 by the recipient, acknowledgement of the message 130 by the recipient, the message 130 has not been delivered to the recipient (e.g., recipient not found, recipient terminal busy, etc.), the recipient has not yet read or listened to the message 130, the message 130 has been read or listened to by the recipient, the recipient has assigned a priority flag to the message 130, the recipient has forwarded the message 130, a reply message has been generated by the recipient, the message 130 has been deleted by the recipient, the recipient has saved the message 130 to a file, the recipient is currently processing the message 130, the presence state of the message 130 has been blocked by the recipient and the recipient has generated a processing state message in response to receipt of the sender's message 130. For example, the processing state message can include an expected completion date/time, a customer service message, such as "Thank-you for your business; we'll respond within 24 hours," an appropriate contact person (e.g., name and phone number) for the message, an order number assigned to the message or other information.

In FIG. 2, only one PA 250 is shown again for simplicity. However, it should be understood that in other embodiments, there can be multiple PAs 250 for a presentity 110, each of which is responsible for a subset of the total subscriptions (requests for presence information from watchers 290) currently active for the presentity 210. The PA 250 aggregates the presence information 260 from the PUA 220 and maintains the current complete presence information 260 for the presentity 210.

The PA 250 further provides the presence information 260 to one or more watchers 290 of the presentity 210. A watcher 290 is defined herein as an application and/or user that has subscribed to receive and view the presence information 260 of the message presentity 210. Typically, the PA 250 interfaces with a presence user client 122 on a watcher terminal 120 (e.g., desktop phone, cell phone, PDA, desktop computer, laptop computer, etc.) via a communications network 280 to provide the current presence state of the presentity 210 to the watcher 290. For example, the watcher terminal 120 can include a graphical user interface 124 for displaying the real-time presence information on a display 126 of the terminal 120 in the form of icons and/or text strings.

In accordance with exemplary embodiments of the present invention, one of the watchers 290 of the message presentity 210 is the sender 110 of the message 130. The sender's presence user client 122 can SUBSCRIBE to the presence of the message presentity 210 either automatically upon receiving notice of the outgoing message from a messaging application or based on user-entered data. In exemplary embodiments, the presence user client 122 is in communication with one or more messaging applications associated with the sender 110 to log each outgoing message generated by the sender 110, to SUBSCRIBE to the presence of each outgoing message, and to provide the presence state of each outgoing message to the sender 110 in a suitable format. For example, the presence user client 122 can be included as part of a "unified messaging application" to monitor the presence state of all outgoing messages (e.g., voice, fax, e-mail and IM). As another example, the presence user client 122 can include one or more presence user clients, each in communication with one or more messaging applications (e.g., a telephony application that is capable of providing outgoing voice mail message information, an e-mail/IM application and/or a fax application) to log outgoing messages and SUBSCRIBE to the presence state of each outgoing message using information identifying each of the outgoing messages (e.g., recipient address, time sent, message type, etc.). In addition, the presence user client 122 can be configured to present the presence states of all outgoing messages within a "Buddy List," within separate views (each associated with a different presence user client) or any other format.

Thus, the sender 110, when registered as a watcher 290 of the presentity 210 with the PA 250, is provided with real-time updates on the presence state of the message 130 (i.e., the processing state of the message by the recipient). Other watchers 290 may also be registered with the PA 250, as allowed by the message sender 110 (e.g., either the To: and/or CC: list or by policy). For example, the sender's boss, administrative assistant, co-worker(s) or other subscriber(s) may also be registered as watchers 290 of the message presentity 210.

The presence server 240 is a physical entity that can operate as either the PA 250 or as a proxy server for routing requests from watchers 290 to the PA 250. The presence server 240 stores the presence information 260 for a plurality of presentities 210. Thus, the PA 250, in combination with the presence server 240, is operable to receive presence information of the presentity 210 from the PUAs 220, receive requests from watchers 290 for the presence information 260 of one or more presentities 210 and provide the requested presence information 260 to the watcher(s) 290. When acting as a PA 250, the presence server 240 can also be co-located with a PUA 220.

The presence server 240 further stores preference information 270 for the presentities 210 and watchers 290 of the presence system 200. For example, in one embodiment, the preference information 270 includes both presentity preference information (e.g., privacy filters) set by the presentity 210 for each watcher 290 and watcher preference information (e.g., watcher filters) set by each watcher 290 for the presentity 210. The preference information 270 serves to filter the presence information 260 of a presentity 210 provided to a watcher 290 to accommodate privacy concerns, prioritization requirements, viewing requirements, administrator policies and security considerations.

In addition, the amount and type of presence information 260 provided to each watcher terminal 120 is dependent upon preference information 270 of both the presentity and the watcher. For example, the presence server 240 may provide the presence information 260 to the watcher terminal 120 in a visual and/or audible format. Thus, the presentation of the presence information 260 to the watcher terminal 120 is customizable by the presentity, watcher and/or presence system administrator by defining preference information 270 in the presence server 240.

The presence system 200 uses a presence protocol to provide presence services to presentities 210 and watchers 290. An example of a presence protocol that can be used in the presence system 100 is the Session Initiation Protocol (SIP), as described in J. Rosenberg, et al., "SIP: Session Initiation Protocol" RFC: 3261, June 2002 and in A. Roach, et al., "Session Initiation Protocol (SIP)—Specific Event Notification," RFC: 3265, June 2002, each of which are hereby incorporated by reference. SIP is an application-layer control protocol used to create, modify and terminate communication (voice, text and/or multimedia) sessions. SIP can be used with other protocols, such as the Real-time Transport Protocol (RTP), the Real-Time Streaming Protocol (RTSP), the Session Description Protocol (SDP), the International Telecommunication Union-Telecommunications ("ITU-T") H.263 standard (video CODEC), the G.711 and G.729 standards (audio CODECs), and other or additional standards or protocols. As will be appreciated, other or additional protocols and configurations may be used.

SIP networks are capable of routing requests from any user on the network to the server that maintains the registration state for a user. Thus, SIP networks enable a watcher 290 to transmit a SUBSCRIBE request for presence information relating to a particular presentity 210 to the presence server 240 that maintains the presence information 260 for the presentity 210. In operation, the presence server 240 and PA 250 may be co-located with the SIP proxy/registrar for efficiency purposes.

As in FIG. 1, in FIG. 2, the communications networks 230 and 280 each represent any type of network over which media (circuit-switched or packet-switched voice or data) may be sent. In addition, in FIG. 2, the communications networks 230 and 280 are capable of routing SIP messages between the PUA 220 and presence server 240 and between the presence server 240 and terminal 120. For example, the communications networks 230 and 280 may include one or more of the following: the Public Switched Telephone Network (PSTN), Public Land Mobile Network (PLMN), one or more private local area networks (LANs), the Internet and/or any other type or combination of networks.

Figure 3:
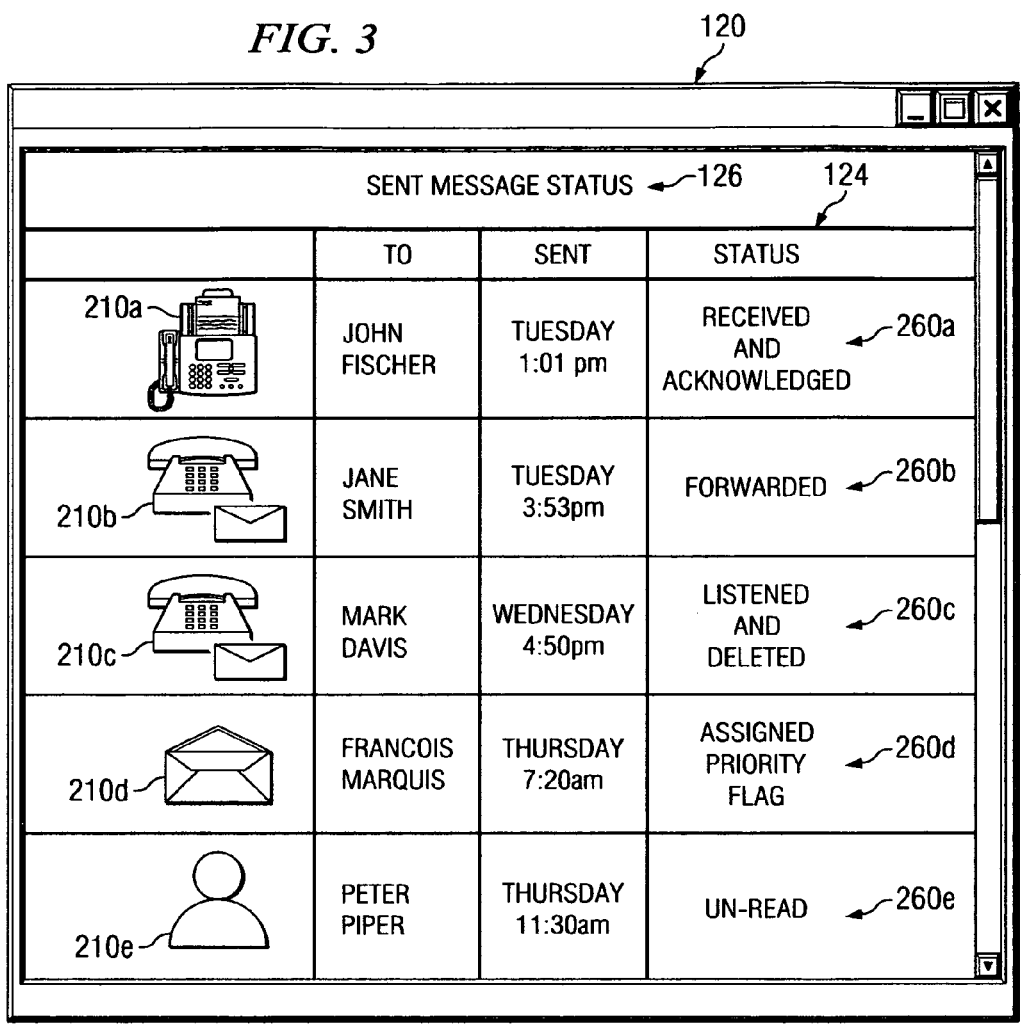
FIG. 3 is a watcher terminal illustrating an exemplary graphical user interface displaying exemplary message presence information, in accordance with embodiments of the present invention.

Examples of presence information 260 displayed on watcher terminals 120 are shown in FIG. 3. The watcher terminal in FIG. 3 is associated with a particular message sender, and includes both a display 126 and a graphical user interface 124 for displaying the presence information 260 on the display 126. In FIG. 3, the graphical user interface 124 displays the presence information 260*a*-260*e* for a plurality of message presentities 210*a*-210*e*, each being associated with a particular electronic message sent by the message sender to a particular recipient, in a list. Thus, in FIG. 3, the sender has subscribed to the presence information 260a-260e of each message presentity 210a-210e and the graphical user interface 124 is presenting the presence information 260a-260e to the sender as a list of sent messages.

The presence information 260a-260e indicates the presence state of each of the message presentities 210a-210c. For example, as shown in FIG. 3, the presence state 260a of a facsimile message 210a sent to John Fischer indicates that the facsimile message 210a has been received and acknowledged by John Fischer, the presence state 260b of a voice mail message 210b sent to Jane Smith indicates that the voice mail message 210b has been forwarded by Jane Smith, the presence state 260c of another voice mail message 210c sent to Mark Davis indicates that the voice mail message 210c has been listened to and deleted by Mark Davis, the presence state 260d of an e-mail message 210d sent to Francois Marquis indicates that the e-mail message has been assigned a priority flag by Francois Marquis and the presence state 260e of an instant message 210e sent to Peter Piper indicates that the instant message 210e has not been read by Peter Piper.

In FIG. 3, the presence information 260 is presented as a combination of text and icons. The icons can be standard icons provided by the presence server or customized icons that are customizable by the user, administrator and/or presence server. In other embodiments, the presence information 260 can be presented only as icons, only as text or in another manner (e.g., bold-face text, italicized text, etc.). In additional embodiments, each icon may represent a link to view additional presence state information associated with the message presentity, to initiate a communication session with the recipient and/or to generate another electronic message to the recipient. For example, the icon associated with a particular message presentity 210 may launch an e-mail application, URL, text message application, voice call application or other link to enable the message sender to access additional services. It should be understood that the icons are merely included as an exemplary tool for providing additional services, and that the links to the additional services may be realized by physical buttons, virtual buttons or other tools.

Figure 4:
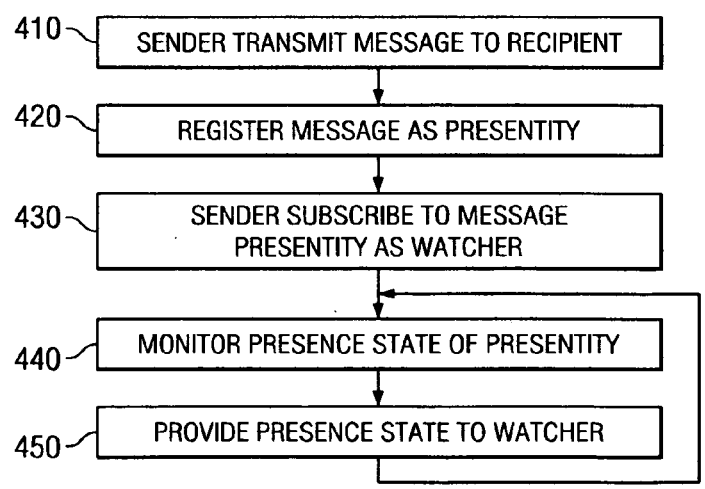
FIG. 4 is a flowchart illustrating an exemplary process for monitoring the presence state of an electronic message, in accordance with embodiments of the present invention.

FIG. 4 is a flowchart illustrating an exemplary process 400 for monitoring the presence state of a message, in accordance with embodiments of the present invention. At block 410, a message sender generates and transmits an electronic message (e.g., voice mail, e-mail, IM or fax) to a message recipient. Upon transmission of the electronic message, at block 420, the message is registered with the presence system as a presentity. For example, when the message is received at the message server associated with the recipient, the message server registers the message as a presentity with a presence server.

Thereafter, at block 430, the sender subscribes to the message presentity as a watcher to receive real-time updates on the presence state of the message presentity. For example, the presence state can indicate the processing state of the message by the recipient (e.g., received, read, listened, forwarded, deleted, saved, etc.). The presence system monitors the presence state of the message presentity at block 440, and provides the presence state of the message presentity to the watcher(s) of the message presentity at block 450. For example, the message server associated with the recipient can transmit PUBLISH or NOTIFY messages to the presence system with updated presence information for the message presentity when the processing state of the message changes (e.g., the recipient reads the message, deletes the message, forwards the message, replies to the message, etc.).

As will be recognized by those skilled in the art, the innovative concepts described in the present application can be modified and varied over a wide rage of applications. Accordingly, the scope of patents subject matter should not be limited to any of the specific exemplary teachings discussed, but is instead defined by the following claims.

I claim:

1. A presence system, comprising:
a presence server coupled to a communication network to receive and maintain presence information associated with a message presentity, wherein said message presentity is a registered presentity with the presence server and is an electronic message, said presence information defining a presence state of said message presentity, said presence state identifying a processing state of said electronic message by a recipient, said presence server being configured to transmit said presence information in real-time to third party watchers that subscribe with the presence server to watch said message presentity via said communication network;
a message server coupled to said communication network to receive said electronic message from said communication network, said electronic message being originated by a sender and addressed to a recipient associated with the message server, the message server including a messaging application and a presence user agent in communication with said messaging application to receive notification from the messaging application of a receipt of said electronic message; and
wherein said presence user agent is further in communication with said presence server via said communication network, wherein said presence user agent is configured to register said electronic message with said presence server as said registered presentity automatically upon notification of receipt of said electronic message from said messaging application, determine said presence information of said message presentity and transmit said presence information of said message presentity to said presence server.

2. The presence system of claim 1, wherein said third party watchers that subscribe with the presence server to watch said message presentity include at least: said sender and a third party.

3. The presence system of claim 1, wherein:
said message server is further configured to process said electronic message and to provide said electronic message to said recipient.

4. The presence system of claim 3, wherein said processing state includes one or more of received, acknowledged, un-delivered, un-read, un-listened, read, listened, assigned priority flag, forwarded, replied-to, deleted, saved to file, in-process, presence blocked or a recipient-defined processing state message.

5. The presence system of claim 1, wherein said electronic message is an electronic mail message, a facsimile message, a voicemail message or an instant message.

6. The presence system of claim 1, further comprising:
a presence user client associated with a select one of said third party watchers operable to receive said presence information of said message presentity from said presence server and to provide said presence information of said message presentity to said select one of said third party watchers.

7. The presence system of claim 6, further comprising:
a terminal on which said presence user client is running, said terminal having a display and including a graphical user interface operably coupled to display said presence information on said display.

8. The presence system of claim 7, wherein said presence user client further maintains a list of message presentities for whom said select one of said third party watchers is a watcher, and enables said select one of said third party watchers to view said presence information of each of said message presentities on said list of message presentities.

9. The presence system of claim 1, wherein said presence server further maintains preference information associated with said message presentity, and is configured to transmit said presence information of said message presentity to said third party watchers based on said preference information.

10. The presence system of claim 1, wherein said presence server further maintains preference information associated with a select one of said third party watchers, and is operable to provide said presence information of said message presentity to said select one of said third party watchers based on said preference information.

11. The presence system of claim 1, wherein said electronic message is an instant message.

12. A method for monitoring the presence state of a message by a presence server, comprising the steps of:
registering an electronic message with a presence server as a message presentity, wherein said electronic message is originated by a sender and addressed to a recipient, and wherein said electronic message is registered automatically by a presence user agent within a message server associated with the recipient in response to notification to the presence user agent of a receipt of said electronic message by a messaging application within said message server;
subscribing third party watchers to watch said message presentity in said presence server;
receiving presence information of said message presentity from said message server by said presence server, said presence information defining a presence state of said message presentity, said presence state identifying a processing state of said electronic message within said message server by said recipient; and
transmitting said presence information in real-time from said presence server to said third party watchers subscribed by the presence server to watch said message presentity.

13. The method of claim 12, wherein said subscribing further comprises the step of:
subscribing said sender by the presence server as one of said third party watchers of said message presentity; and
subscribing a third party by the presence server as another one of said third party watchers of said message presentity.

14. The method of claim 12, further comprising the steps of:
receiving said electronic message at said message server associated with said recipient;
processing said electronic message at said message server;
transmitting said electronic message from said message server to said recipient; and
transmitting a registration message to said presence server to register said electronic message as said message presentity.

15. The method of claim 14, wherein said maintaining further comprises the steps of:
determining said presence information of said message presentity at said message server; and
providing said presence information from said message server to said presence server.

16. The method of claim 12, wherein said processing state includes one or more of received, acknowledged, un-delivered, un-read, un-listened, read, listened, assigned priority flag, forwarded, replied-to, deleted, saved to file, in-process, presence blocked or a recipient-defined processing state message.

17. The method of claim 12, wherein said electronic message is an electronic mail message, a facsimile message, a voice mail message or an instant message.

18. The method of claim 12, wherein said transmitting further comprises the steps of:
receiving said presence information at a terminal associated with a select one of said third party watchers; and
displaying said presence information on said terminal to said select one of said third party watchers.

19. The method of claim 18, further comprising the steps of:
maintaining a list of message presentities for whom said select one of said third party watchers is a watcher on said terminal; and
displaying said presence information of each of said message presentities on said list of message presentities to said select one of said third party watchers on said terminal.

20. The method of claim 12, wherein said providing further comprises the steps of:
maintaining preference information associated with said message presentity at said presence server; and
providing said presence information to said third party watchers based on said preference information.

21. The method of claim 12, wherein said providing further comprises the steps of:
maintaining preference information associated with a select one of said third party watchers at said presence server; and
providing said presence information to said select one of said third party watchers based on said preference information.

* * * * *